US008272406B2

(12) United States Patent     (10) Patent No.: US 8,272,406 B2
McKaigue et al.     (45) Date of Patent: Sep. 25, 2012

(54) METHODS FOR REHABILITATING CONDUITS USING STRUCTURAL LINERS

(75) Inventors: Shaun McKaigue, Bradford (CA); Robert Philpott, Courtice (CA)

(73) Assignee: Fer-Pal Construction Ltd., North York, ON (CA)

( * ) Notice: Subject to any disclaimer, the term of this patent is extended or adjusted under 35 U.S.C. 154(b) by 629 days.

(21) Appl. No.: 12/461,335

(22) Filed: Aug. 7, 2009

(65) Prior Publication Data

US 2011/0030830 A1    Feb. 10, 2011

(51) Int. Cl.
*F16L 55/10* (2006.01)
(52) U.S. Cl. ....... 138/98; 264/269; 264/36.16; 264/267; 264/36.15; 405/184.5; 405/150.1; 405/184.1; 156/293; 156/294; 156/287
(58) Field of Classification Search ............. 138/98, 138/97; 156/293, 294, 287, 267; 405/184.5, 405/184.1, 184.2, 150.1; 264/267, 269, 516, 264/36.15, 36.16, 36.17
See application file for complete search history.

(56) References Cited

U.S. PATENT DOCUMENTS

| | | | | |
|---|---|---|---|---|
| 5,296,073 A | * | 3/1994 | Stafford et al. ............. | 156/272.2 |
| 5,609,439 A | * | 3/1997 | Schreiner et al. ........... | 405/184.2 |
| 5,944,058 A | * | 8/1999 | Kamiyama et al. .......... | 138/98 |
| 5,971,032 A | * | 10/1999 | Ward .......................... | 138/98 |
| 6,056,017 A | * | 5/2000 | Kamiyama et al. .......... | 138/98 |
| 6,082,411 A | * | 7/2000 | Ward .......................... | 138/98 |
| 6,103,052 A | * | 8/2000 | Kamiyama et al. .......... | 156/253 |
| 6,117,507 A | | 9/2000 | Smith ......................... | 138/97 |
| 6,641,688 B1 | * | 11/2003 | Gearhart ..................... | 156/95 |
| 7,094,308 B1 | * | 8/2006 | Gearhart ..................... | 156/293 |
| 7,398,797 B2 | * | 7/2008 | Kamiyama et al. .......... | 138/98 |
| 7,481,246 B2 | * | 1/2009 | Kamiyama et al. .......... | 138/98 |
| 7,975,726 B2 | * | 7/2011 | Kiest, Jr. ..................... | 138/98 |
| 7,987,873 B2 | * | 8/2011 | Kiest, Jr. ..................... | 138/98 |
| 8,015,695 B2 | * | 9/2011 | Polivka et al. ............... | 29/709 |
| 2003/0138298 A1 | * | 7/2003 | Mercier ....................... | 405/184.2 |

FOREIGN PATENT DOCUMENTS

| | | |
|---|---|---|
| CA | 2361960 | 5/2002 |
| CA | 2630074 | 11/2008 |

* cited by examiner

*Primary Examiner* — Patrick F Brinson
(74) *Attorney, Agent, or Firm* — Fasken Martineau Dumoulin LLP (57) ABSTRACT

The present invention relates generally to the field of structural pipe lining for conduit rehabilitation and more specifically, to methods for rehabilitating conduits using structural liners. There is provided a method for rehabilitating a tubular conduit having an inner conduit space and at least one service connection tied into the tubular conduit. A portion of the at least one service connection protrudes into the inner conduit space. A liner is provided for covering the inner surface of the tubular conduit. The liner is made of a flexible material capable of being impregnated with a first curable adhesive resin and has a film made of a material impermeable to liquid bonded onto the inner surface of the liner. Also provided, is a flexible sealing member made of a second curable adhesive resin. The method includes the steps of providing access to the inner conduit space of the tubular conduit and snugly fitting the sealing member onto the protruding portion of the at least one service connection in surrounding relation therewith. The liner and the sealing member together form a unitary structure and a seal about the protruding portion of the at least one service connection once the first curable resin and the second curable resin have hardened.

39 Claims, 8 Drawing Sheets

METHODS FOR REHABILITATING CONDUITS USING STRUCTURAL LINERS

FIELD OF THE INVENTION

The present invention relates generally to the field of structural pipe lining for conduit rehabilitation and more specifically, to methods for rehabilitating conduits using structural liners.

BACKGROUND OF THE INVENTION

A significant portion of water mains throughout North America are made from unlined cast-iron pipe as this was the preferred material for water distribution systems up until the mid-1970s. Over time the carrying capacity of these water mains may be severely reduced or compromised as the pipes begin to deteriorate. One major cause of deterioration in these pipes or conduits is corrosion. As the cast-iron corrodes, the interior wall of the pipe becomes pitted as material is lost, thereby forming tubercules. This corroded material, in combination with mineral deposits, is known as encrustation and tuberculation.

Different solutions exist for addressing these problems. One solution, known as "open-cut replacement", requires a work area to be excavated to expose the pipe in need of repair and replacing the iron piping system altogether. While this solution may be appropriate where the structurally integrity of the pipe has been too badly compromised to be rehabilitated, it tends to be very costly and labour-intensive and as a result, may not be ideally suited to cases where the structural integrity of the existing pipe remains adequate.

Other solutions involve rehabilitating the pipe or conduit by lining its interior surface with cement mortar (often referred to as a "spray-on liner") or by deploying a structural liner within the pipe. These conduit rehabilitation solutions may be implemented cost-effectively using trenchless technology techniques which minimize the excavation work required.

Canadian Patent No. 2,361,960 of Mercier describes a method of rehabilitating a conduit having protruding service connections using a cured-in-place structural liner. The liner is made up of two (2) concentric tubular jackets—an outer jacket and an inner jacket—made of a flexible material that is capable of being impregnated by an adhesive resin. Bonded to an inner surface of the inner jacket is an impermeable film made of a material impermeable to liquid. The conduit rehabilitation method described in this patent requires as a preliminary step that the tubular jackets of the liner be impregnated with a curable adhesive resin. The liner is then inserted into one end of the conduit and pulled into place. Once the liner is in position, a shaping step is performed to urge the liner to conform to the inner wall of the conduit. During the shaping or forming of the liner, the liner is pushed up against the protruding end of the service connection. The adhesive resin impregnated within the liner is urged to flow around the threading of the protruding end so as to at least partially fill the spaces defined between the threading of the protruding end. Next heated water is flowed through the now lined conduit to cause the curable adhesive resin to cure. Once cured, the liner will be form a rigid structure that is bonded to the outer surface of the conduit. Thereafter, access to the service connection can be restored by drilling a hole into the liner at the location of corporation stop.

In the field, the method for water conduit rehabilitation described in Canadian Patent No. 2,361,960 has been found to be successful and relatively easy and cost effective to deploy. However, while in most cases, the seal achieved by the cured adhesive resin about the protruding end of the service connection has proven to be adequate, there have been some field applications where this seal has failed. In such applications, the failure of the seal has resulted in water infiltrating or seeping around the corporation stop and between the liner and the outer surface of the conduit, thereby compromising the water tightness of the liner in that region and making remedial action necessary. As it may be appreciated, such remedial action is to be avoided as much as possible as it tends to create a service disruption and tends to increase the costs of conduit rehabilitation.

In light of the foregoing, it would be advantageous to have a method for rehabilitating conduits using cured-in-place structural liners with improved sealing around the service connections so as to obviate the drawbacks associated with the above-described prior art conduit rehabilitation methods. Preferably, such improved sealing could be provided in a relatively simple, cost-effective manner and without unduly extending the time required to carry out the conduit rehabilitation method.

SUMMARY OF THE INVENTION

In accordance with one embodiment of the present invention, there is provided a method for rehabilitating a tubular conduit having an inner conduit space and at least one service connection tied into the tubular conduit. A portion of the at least one service connection protrudes into the inner conduit space. A liner is provided for covering the inner surface of the tubular conduit. The liner is made of a flexible material capable of being impregnated with a first curable adhesive resin and has a film made of a material impermeable to liquid bonded onto the inner surface of the liner. Also provided, is a flexible sealing member made of a second curable adhesive resin. The method includes the steps of providing access to the inner conduit space of the tubular conduit and snugly fitting the sealing member onto the protruding portion of the at least one service connection in surrounding relation therewith. The liner is impregnated with the first curable adhesive resin and then inserted into the tubular conduit. Thereafter, the liner is shaped to conform to the inner surface of the tubular conduit with a portion of the liner bearing against the protruding portion of the at least one service connection. The method further includes the step of curing the first curable adhesive resin in the liner and the second curable adhesive resin in the sealing member so as to: (a) initially cause the second curable adhesive resin to deform and to at least partially occupy gaps between the protruding portion of the at least one service connection and the liner and, (b) subsequently cause the first curable adhesive resin and the second curable resin to harden. The liner and the sealing member together form a unitary structure and a seal about the protruding portion of the at least one service connection once the first curable resin and the second curable resin have hardened. Thereafter the service connection is opened from within the inner conduit space.

In another feature, the method further includes, prior to the snugly fitting step, transporting the sealing member to a location directly below the protruding portion of the at least one service connection. In an additional feature, the sealing member has a body provided with a central aperture. The snugly fitting step further includes: aligning the central aperture of the sealing member with the protruding portion of the at least one service connection; causing the protruding portion of the at least one service connection to be received within the central aperture of the sealing member; urging the top surface of the sealing member to bear against the inner surface of the tubular conduit and causing the body of the sealing member to flex to conform to the curvature of the inner surface of the tubular conduit.

In yet another feature, the method further includes the step of a providing a robot. The robot includes a transport skid for traveling within the inner conduit space, a lift assembly supported on the skid and a holder mounted on the lift assembly for retaining the sealing member. The snugly fitting step is carried out by a remote controlled robot. The method further includes the steps of: placing the sealing member into the holder; moving the transport skid in the tubular conduit to a location directly below the protruding portion of the at least one service connection; actuating the lift assembly to raise the sealing member up to the protruding portion of the at least one service connection.

In still another feature, the shaping step and the curing step are carried out concurrently. In a further feature, the curing step includes exposing the first curable adhesive resin in the liner and the second curable adhesive resin in the sealing member to heat. The exposing step includes circulating hot pressurized water within the space defined by the inner surface of the liner.

In yet another feature, the second curable adhesive resin is the same as the first curable adhesive resin. In a further feature, the first curable adhesive resin is made from a 3:1 ratio of resin to hardener and the second curable adhesive resin is made from between a 1:1 ratio of resin to hardener to a 3:1 ratio of resin to hardener. The second curable adhesive resin has a curing temperature that is less than or equal to the curing temperature of the first curable adhesive resin. The curing temperatures of the first and second curable adhesive resins lie between approximately 64° C. and approximately 74° C.

In an additional feature, the sealing member has an annular body provided with a central aperture. The annular body has an outer diameter and an inner diameter corresponding to the diameter of the central aperture. The ratio of annular body outer diameter to annular body inner diameter ranges between approximately 1.5 and approximately 2.0. In another feature, the annular body has a top surface, a bottom surface and a thickness T measured between the top and bottom surfaces. The thickness T measures between approximately 2.0 mm and approximately 5.0 mm.

In accordance with another embodiment of the present invention, there is provided a kit for rehabilitating a tubular conduit having an inner conduit space and at least one service connection tied into the tubular conduit. A portion of the service connection protrudes into the inner conduit space. The kit includes a liner capable of being shaped to conform to the inner surface of the tubular conduit. The liner is made of a flexible material capable of being impregnated with a first curable adhesive resin and has a film made of a material impermeable to liquid bonded onto the inner surface of the liner. Also provided is, a flexible sealing member made of a second curable adhesive resin. The sealing member is configured to snugly fit onto the protruding portion of the at least one service connection in surrounding relation therewith. When the liner is shaped to conform to the inner surface of the tubular conduit, the sealing member is snugly fitted onto the protruding section of the at least one service connection and the first and second curable adhesive resins are cured, the liner and the sealing member together form a unitary structure and a seal about the protruding section of the at least one service connection.

In an additional feature, the liner is a multi-ply liner. In another feature, the liner is an inversion-type liner. In still a further feature, the liner has an outer jacket for placement against the inner surface of the tubular conduit and an inner jacket. The inner surface of the inner jacket corresponds to the inner surface of the liner.

In still another feature, the first curable adhesive resin is made from a 3:1 ratio of resin to hardener and the second curable adhesive resin is made from between a 1:1 ratio of resin to hardener to a 3:1 ratio of resin to hardener. In yet another feature, the second curable adhesive resin is the same as the first curable adhesive resin. The second curable adhesive resin has a curing temperature that is less than or equal to the curing temperature of the first curable adhesive resin. The curing temperatures of the first and second curable adhesive resins lie between approximately 64° C. and approximately 74° C.

In yet another feature, the sealing member has an annular body provided with a central aperture. The annular body has an outer diameter and an inner diameter corresponding to the diameter of the central aperture. The ratio of annular body outer diameter to annular body inner diameter ranges between approximately 1.5 and approximately 2.0.

In a further feature, the annular body has a top surface, a bottom surface and a thickness T measured between the top and bottom surfaces. The thickness T measures between approximately 2.0 mm and approximately 5.0 mm.

In still a further feature, a robot is provided for snugly fitting the sealing member onto the protruding portion of the at least one service connection. The robot includes a transport skid for traveling within the inner conduit space, a lift assembly supported on the skid and a holder mounted on the lift assembly for retaining the sealing member. The lift assembly is operable to raise the holder toward the protruding portion of the at least one service connection.

In accordance with yet another embodiment of the present invention, there is provided a rehabilitated conduit. The rehabilitated conduit includes a tubular conduit having an inner conduit space and at least one service connection tied into the tubular conduit. A portion of the at least one service connection protruding into the inner conduit space. Also provided is, a liner made of a flexible material impregnated with a first curable adhesive resin. The liner has a film made of a material impermeable to liquid bonded onto the inner surface of the liner. The liner is cured in place and shaped to conform to, and bonded to, the inner surface of the tubular conduit. The rehabilitated conduit further includes a sealing member made of a second curable adhesive resin. The sealing member is mounted onto the protruding portion of the at least one service connection in surrounding relation therewith and is cured in place. The liner and the sealing member together forming a unitary structure and a seal about the protruding portion of the at least one service connection.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF THE EMBODIMENTS OF THE INVENTION

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Figure 1:
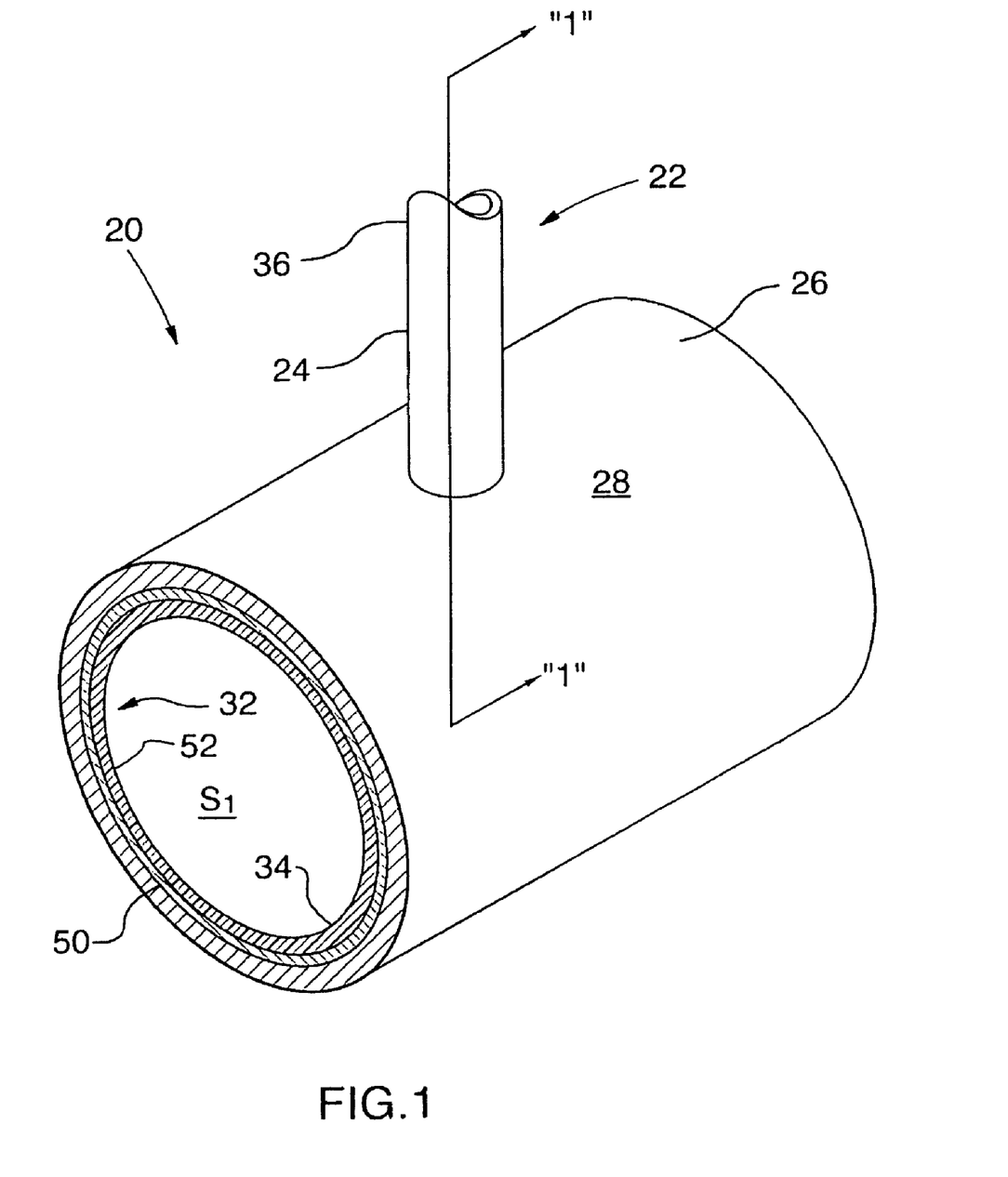
FIG. 1 is a perspective view of a main conduit provided with a service connection, the inner wall of the main conduit shown covered with a liner for rehabilitating the main conduit in accordance with an embodiment of the present invention.
Figure 2:
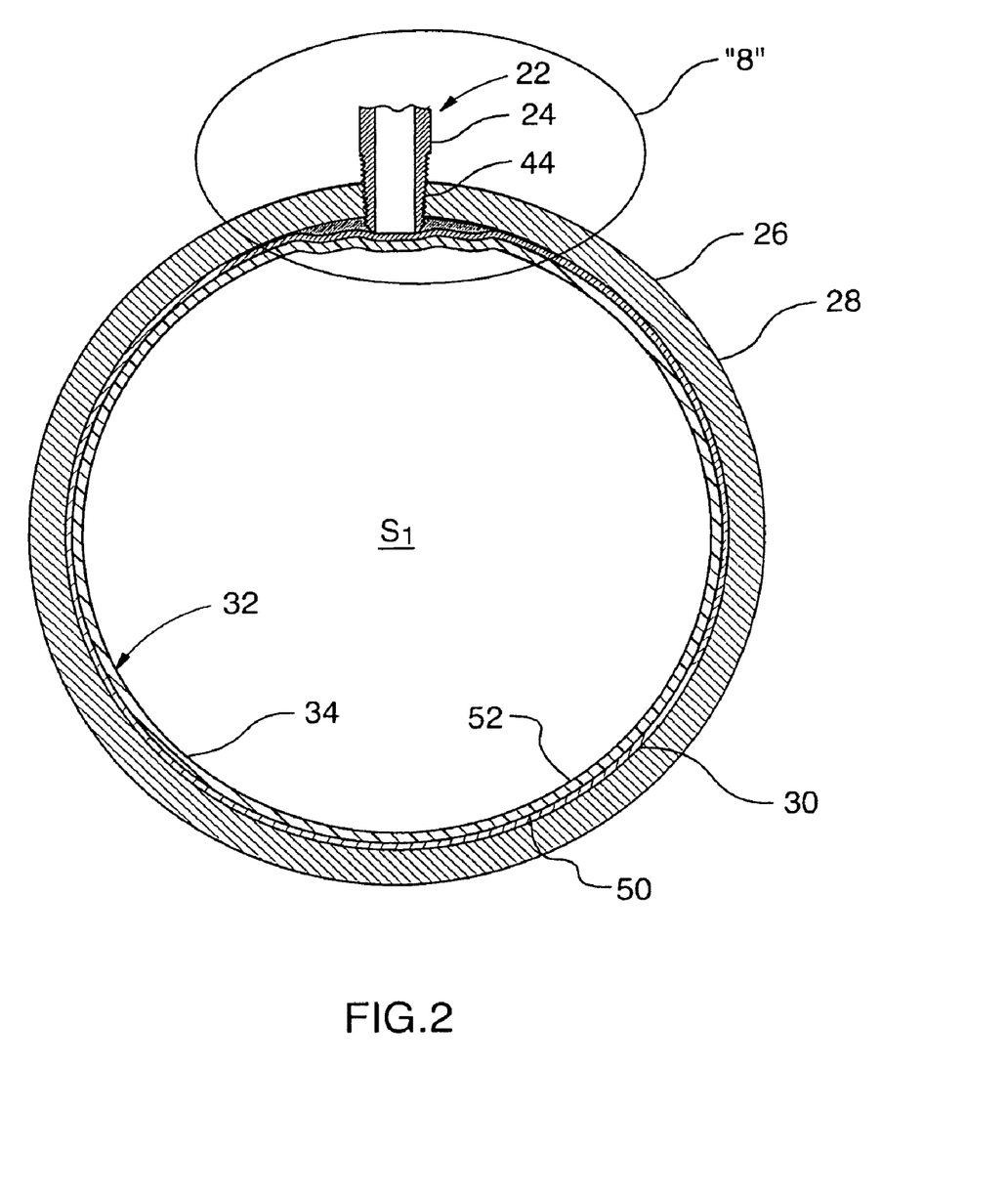
FIG. 2 is a cross-sectional view of the main conduit shown in FIG. 1 taken along line "1-1"

Referring to FIGS. 1 and 2, there is shown a main conduit or pipe generally designated with reference numeral 20. In the present embodiment, the main conduit 20 is a municipal conduit which runs below ground and forms part of a network of water works conduits delivering potable water to residents of a neighbourhood via service connections disposed in fluid communication with the main conduit 20. One such service connection 22 having a corporation stop 24 is shown in FIG. 1. The service connection 22 and corporation stop 24 shown in the drawings are merely representative. A main conduit like main conduit 20 would have a large number of such service connections and corporation stops.

However, it should be appreciated that in alternative embodiments, the main conduit could be a stand-alone pipe and could be located above ground. In other embodiments, the main conduit could be used to convey other pressurized fluids (i.e. liquids or gasses). Moreover, the main conduit could be an oil pipe, an HVAC duct, a gas main, sewer line, an industrial effluent line or the like.

Figure 5:
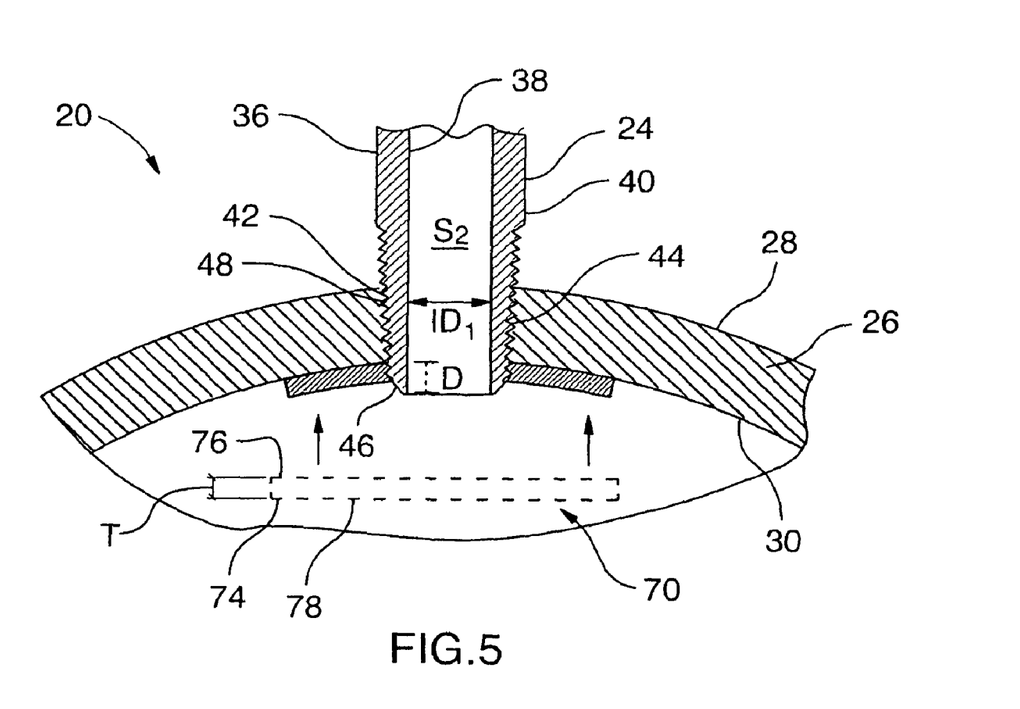
FIG. 5 is an enlarged partial cross-sectional view of the main conduit illustrated in FIG. 1, with the main conduit and service connection being shown prior to the installation of the liner, and an annular sealing member being fitted onto the inflow end of the service connection.

The main conduit 20 has a generally tubular configuration defined by a conduit wall 26 provided with an outer surface 28 and an inner surface 30 (best shown in FIG. 5). The inner surface 30 would ordinarily bound the conduit space through which the water flows within the main conduit 20. However, in this embodiment, the main conduit 20 was damaged (e.g. it had cracks or other structural or physical anomalies or deficiencies) and was in need or repair. As will be explained in greater detail below, the main conduit 20 was rehabilitated using a cured-in-place, composite material liner 32 which conformingly lines, and may be bonded to, the inner surface 30 of the conduit wall 26. Accordingly, it is the inner surface 34 of the liner 32 which now defines the conduit space $S_1$ through which the water flows.

As shown in FIGS. 2 and 5, the corporation stop 24 is disposed generally perpendicular to the conduit 20 and has a tapered inflow end 46 which extends (or taps) into the conduit 20 through a threaded aperture (not shown) defined in the conduit wall 26. A pipe wall 36 defines the generally tubular configuration of the corporation stop 24. The pipe wall 36 has an inner surface 38 which defines a pipe space $S_2$ of substantially constant internal diameter $ID_1$, and an outer surface 40. Male threading 42 provided on the outer surface 40 of the pipe wall 36 is engageable with corresponding female threading 48 surrounding the aperture in the conduit wall 26 to allow the portion 44 of the corporation stop 22 to be securely attached to the main conduit 20.

Figure 3:
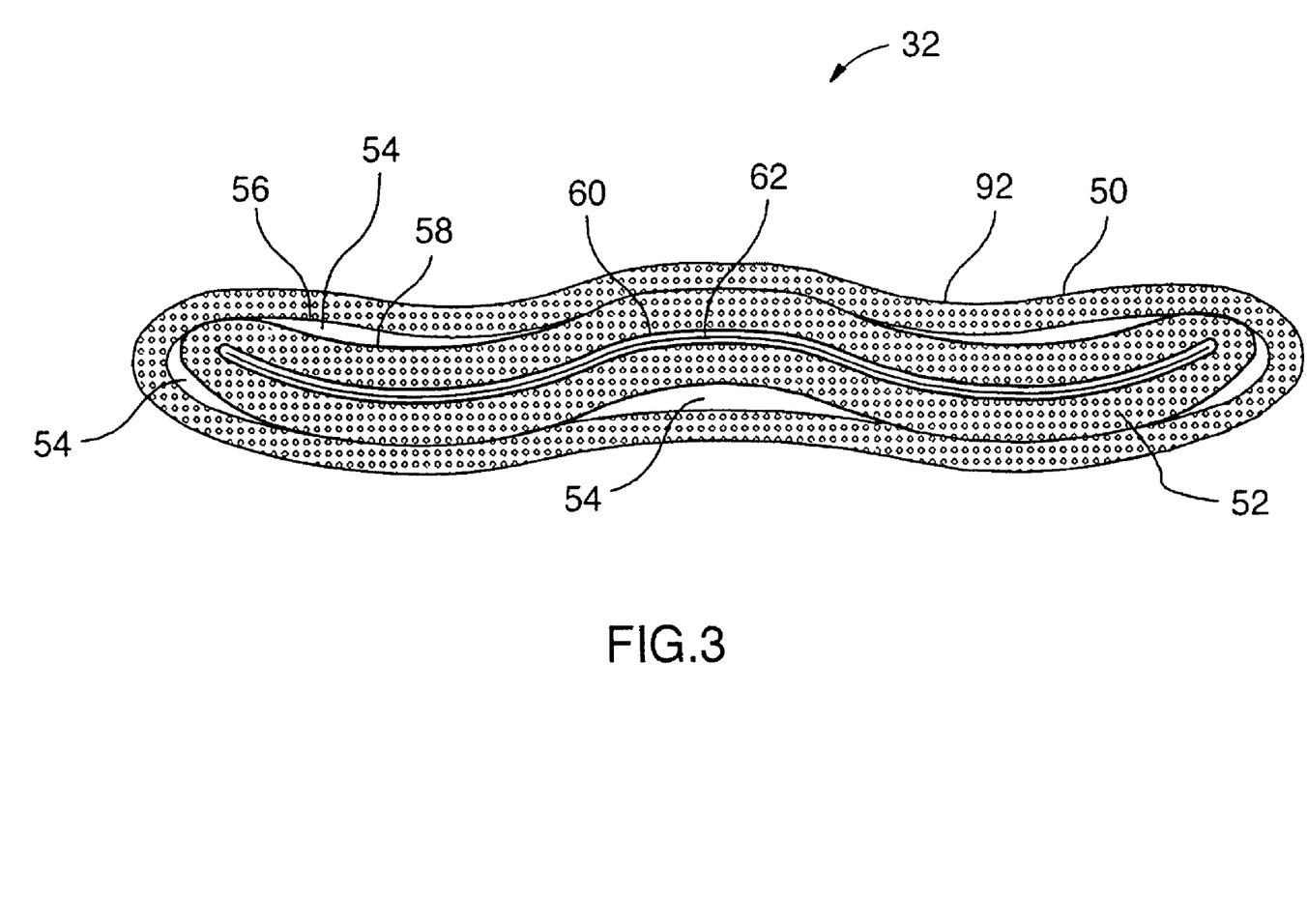
FIG. 3 is an elevation view of a liner prior to being deployed for use in rehabilitating a conduit, in accordance with an embodiment of the present invention.

When the corporation stop 24 is secured in place, the inflow end 46 of the portion 44 protrudes beyond the inner surface 30 of the conduit wall 26 and into the conduit space $S_1$, a distance D. In the present embodiment, the distance D is 0.5 inch. In other embodiments, the distance D may vary and could be greater or lesser than 0.5 inch. In most cases, the distance D will be less than 1 inch. As best shown in FIG. 3, the pipe wall 36 is chamfered at the tip of the inflow end 46.

In this embodiment, the liner 32 used to rehabilitate main conduit 20 is of the type described in Canadian Patent No. 2,361,960 of Mercier; the disclosure of which is hereby incorporated by reference. While the structure and construction of such liners is generally known to those skilled in the art, for the sake of completeness, a brief description of the liner 32 follows. As best shown in FIG. 3, the liner 32 includes two concentric tubular jackets—an outer jacket 50 and an inner jacket 52 received within, and surrounded by, the outer jacket 50. Voids or spaces 54 exist between the inner surface 56 of the outer jacket 50 and the outer surface 58 of the inner jacket 52. As explained below, prior to deployment of the liner 32 within the main conduit 20, the voids 54 are at least partially filled with a curable adhesive resin with which to impregnate the outer and inner jackets 50 and 52.

The outer and inner jackets 50 and 52 are made of a flexible material, preferably a woven textile. In the present embodiment, the woven textile is a plain-weave polyester. In alternative embodiments, the woven textile may be a synthetic polymeric fiber, such as a polyester fiber, a glass fiber or a carbonaceous fiber. The jacket material is selected to allow the outer and inner jackets 50 and 52 to be sufficiently impregnated with the curable adhesive resin, while permitting air to escape therefrom. Moreover, the jacket material should be robust enough to withstand the tensile stresses resulting from being pulled into place during deployment in the main conduit 20, and the relatively high, internal fluid pressures which exist in the main conduit once rehabilitated.

Bonded to the inner surface 60 of the inner jacket 52 is a thin layer or film 62 of material which is impermeable to liquid. In this embodiment, the material is impermeable to water and potable water compatible. While in this embodiment, the film 62 is made of a polyurethane elastomer, in other embodiments, the material may be polyethylene, polyamide, synthetic rubbers and any other elastomers of polymeric resins. Once the liner 32 is in place in the main conduit 20 and the rehabilitated main conduit 20 is back in service, the film 62 serves to maintain a watertight barrier preventing water from seeping through the outer and inner jackets 50 and 52.

The curable adhesive resin with which the outer and inner jackets 50 and 52 are impregnated, may be obtained by mixing a resin and a hardener. The resin may be an epoxy, polyurea, vinyl ester or any other suitable resin. In the present embodiment, the resin and hardener are both manufactured and sold by Adhpro Adhesives Inc. of Magog, Quebec, Canada, under the product identifiers 65071 AQUEDUC A-071 and 95071 AQUEDUC B-071, respectively. These products are safe and are compatible for use with potable water.

Preferably, the ratio (by volume) of resin to hardener in the curable adhesive resin is 3:1 and the adhesive resin cures at a temperature ranging between approximately 64° C. and approximately 74° C. In this embodiment, the curing temperature of the adhesive resin is 64° C. The curing temperature could be different if other curable adhesive resins are used. The curable adhesive resin serves a dual purpose. Once cured, it permits the liner 32 to adhere to the inner surface 30 of the main conduit 20 and it forms part of the liner structure.

While in the preferred embodiment, the adhesive resin is cured with hot water, it will be appreciated that this need not be the case in every application. In other embodiments, where a different adhesive resin is employed, the adhesive resin could be cured with steam, with the exposure to an ultraviolet (UV) light, or with the introduction of a curing catalyst.

Figure 4:
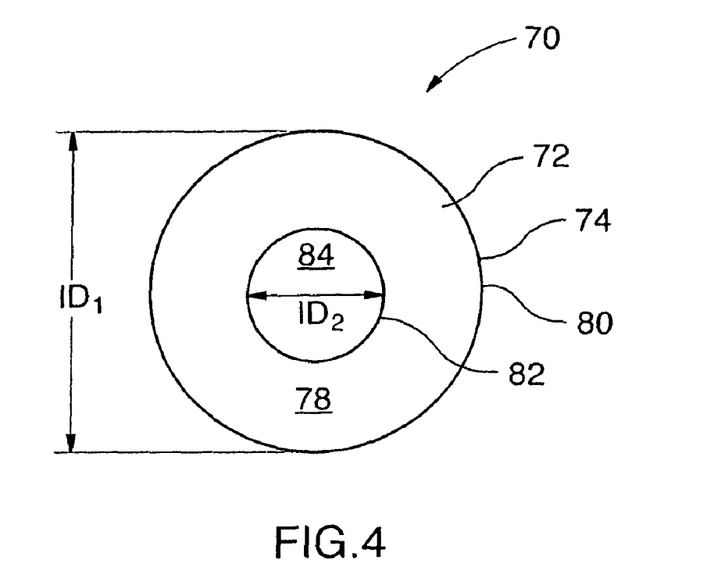
FIG. 4 is a top plan view of an annular sealing member in accordance with an embodiment of the present invention.

Referring now to FIG. 4, there is shown a resilient gasket or sealing member 70 in accordance with an embodiment of the invention. As will be explained in greater detail below, the sealing member 70 is designed to fit onto the end 46 of the corporation stop 24 and to provide enhanced sealing between the liner 32 and the corporation stop 24 once cured. The sealing member 70 has a generally molded body 72 defined by a relatively thin sidewall 74. The sealing member shown in FIG. 4 is initially formed as a disc into which an aperture is punched out. In other embodiments, the sealing member could be molded as an annular body obviating the need for a hole punching step. Preferably, the thickness T of the sidewall 74 lies between approximately 2.0 mm and approximately 5.0 mm. In the present embodiment, the thickness T of sidewall 74 measures 3.7 mm.

When selecting the appropriate thickness T for the sidewall 74, the distance D should be taken into account. Preferably, the greater the distance D, the greater the thickness T should be. In this regard, it has been found that: (a) a thickness T of 2.0 mm tends to be suitable where the distance D measures less than approximately 12.7 mm; (b) a thickness T of between 2.5 mm and 3.0 mm tends to be suitable where the distance D measures between approximately 12.7 mm and approximately 15.875 mm; (c) a thickness T of between 3.0 mm and 4.0 mm tends to be suitable where the distance D measures between approximately 15.875 mm and approximately 19.05 mm; and (d) a thickness T of between 4.0 mm and 5.0 mm tends to be suitable where the distance D measures between approximately 19.05 mm and approximately 25.4 mm. It should be appreciated that in certain applications, a different thickness T could be selected for a given distance D.

The sidewall 74 has a first surface 76 and an opposed second surface 78 (as best shown in FIGS. 4 and 5), and is bounded circumferentially by an outer edge 80 and inner edge 82. The aperture 84 defined by the inner edge 82 is sized only slightly larger than the inflow end 46 to allow a snug fit between the sealing member 70 and the pipe wall 36—more specifically, between the sidewall 74 and the threading 42 on the outer surface 40. The annular body 72 has an inner diameter $ID_2$ which corresponds to the diameter of the aperture 84, and an outer diameter $OD_1$. Preferably, the $OD_1$:$ID_2$ ratio ranges between approximately 1.5 and approximately 2.0. In this embodiment, the outer diameter $OD_1$ measures 55 mm; the inner diameter $ID_2$ measures 30 mm; and the $OD_1$:$ID_2$ ratio is 1.83.

Preferably, the outer diameter $OD_1$ measures between 45 mm and 65 mm. In this regard, it has been found that: (a) a sealing member having a 45 mm outer diameter $OD_1$ tends to be suitable for use with a corporation stop having an inner diameter $ID_1$ which measures approximately 12.7 mm; (b) a sealing member having a 55 mm outer diameter $OD_1$ tends to be suitable for use with a corporation stop having an inner diameter $ID_1$ which measures approximately 15.875 mm; (c) a sealing member having a 60 mm outer diameter $OD_1$ tends to be suitable for use with a corporation stop having an inner diameter $ID_1$ which measures approximately 19.05 mm; and (d) a sealing member having a 65 mm outer diameter $OD_1$ tends to be suitable for use with a corporation stop having an inner diameter $ID_1$ which measures approximately 25.4 mm. In certain applications, an outer diameter $OD_1$ different than that set out above could be selected for a given inner diameter $ID_1$. However, it is preferred that the $OD_1$:$ID_1$ ratio be between approximately 2.5 and approximately 4.0.

While it is preferred that the sealing member have a generally circular footprint, it will be appreciated that in other embodiments the footprint of the sealing member could be shaped differently. For instance, the sealing member could be configured to have an oval, square or rectangular footprint.

Figure 8:
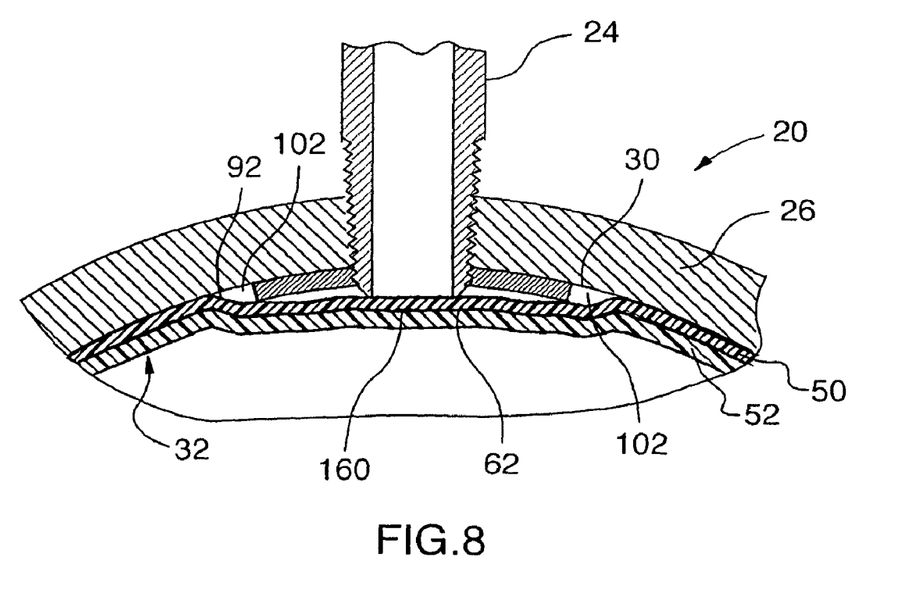
FIG. 8 is an enlarged partial cross-sectional view similar to that illustrated in FIG. 5 showing the sealing member fitted onto the service connection and the liner deployed within the main conduit prior to curing.

The sealing member 70 must be sufficiently resilient so that during installation onto the inflow end 46 of the corporation stop 24 as the sealing member 70 is being placed up against the main conduit 20 it can flex to conform to the curvature of the inner surface 30 of the main conduit 20, as shown in FIGS. 5 and 8. As explained in greater detail below, during the curing process the sealing member 70 will merge or integrate with the liner 32 to form a unitary structure therewith. To further this end, it is preferable that the sealing member 70 be made of the same or substantially the same combination of resin and hardener as the curable adhesive resin (i.e. a resin to hardener ratio of 3:1). However, the resin to hardener ratio for the sealing member 70 need not be 3:1 in every application. In some applications, it may be advantageous to use a resin to hardener ratio of less than 3:1. For instance, the resin to hardener ratio could lie between 3:1 and 1:1. It has been found that using a resin to hardener ratio of 1:1 tends to enhance the malleability of the sealing member 70. This in turn tends to facilitate shaping the sealing member 70 to conform to the curvature of the outer surface 30, when the sealing member 70 is fitted onto the corporation stop 24. As an additional advantage, it has been found that sealing members made using a resin to hardener ratio of 1:1 can be stored for longer periods of time without deteriorating than those made with a resin to hardener ratio of 3:1.

It should be appreciated that the exact ratio of resin to hardener used to fabricate the sealing member 70 will vary depending on the specific resin and hardener combination selected.

To ensure that the sealing member 70 properly merges with the liner 32 during the curing process, the temperature required to cure the constituent resin and hardener mixture of the sealing member 70 should be no greater than the curing temperature of the curable adhesive resin which impregnates the liner 32. While in this embodiment, the curing temperature of the sealing member 70 is equal to the curing temperature of the curable adhesive resin, in alternative embodiments, the curing temperature of the sealing member 70 could be less than the curing temperature of the curable adhesive resin.

Figure 6A:
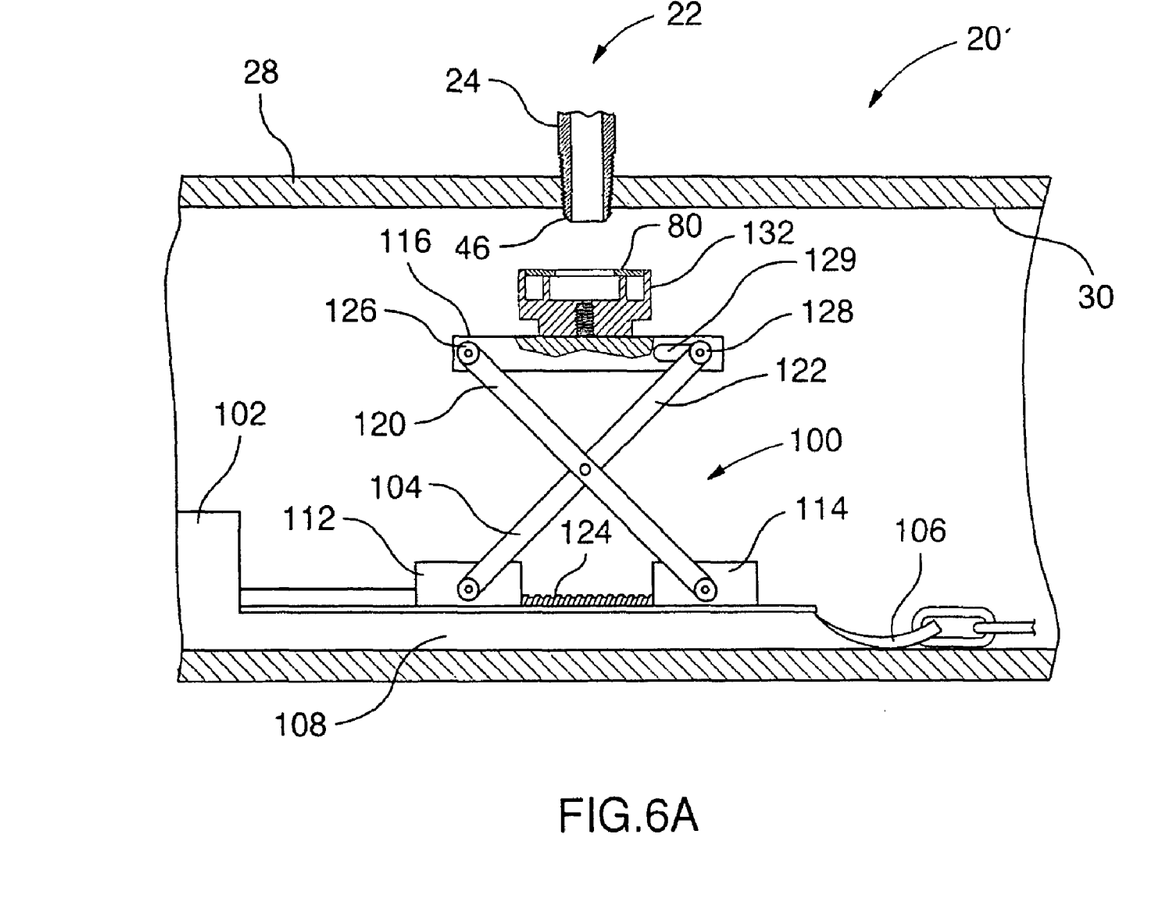
FIGS. 6a and 6b depict other cross-sectional views of the main conduit illustrated in FIG. 1 taken on an axis perpendicular to line "1-1", showing a robot within the main conduit fitting the annular sealing member onto the inflow end of the service connection.
Figure 6B:
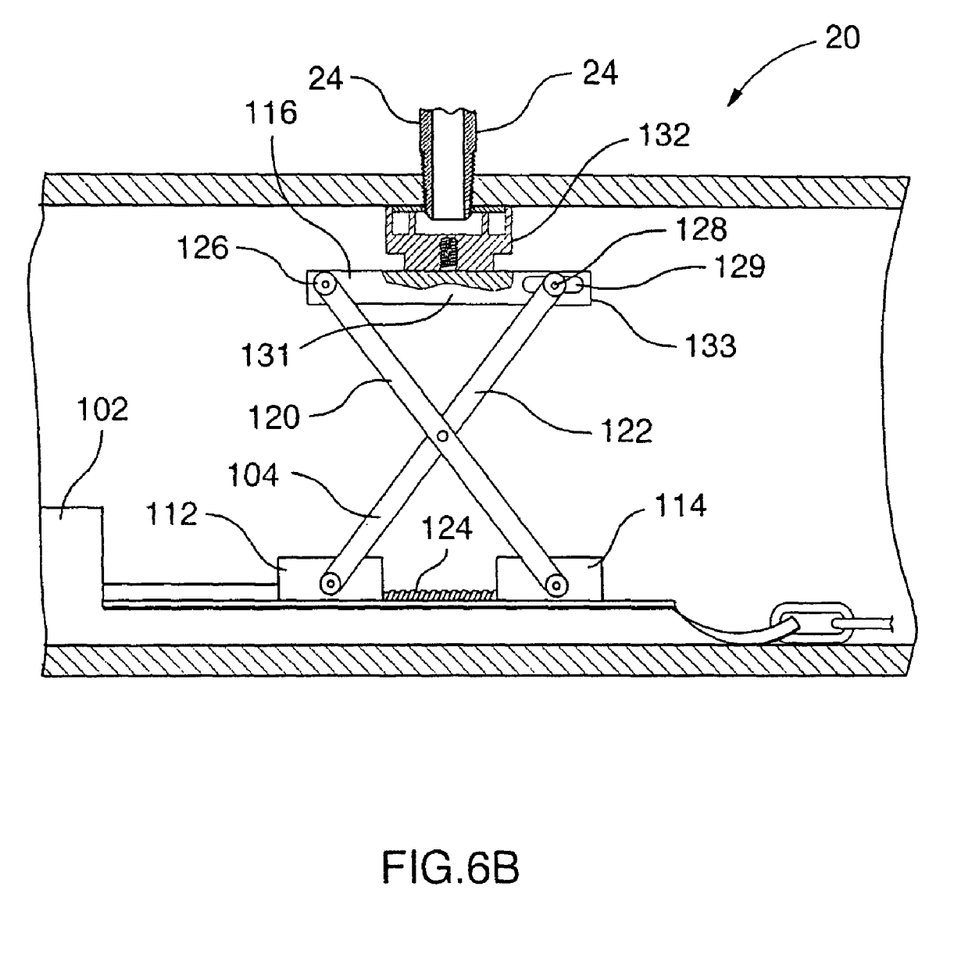
Figure 7:
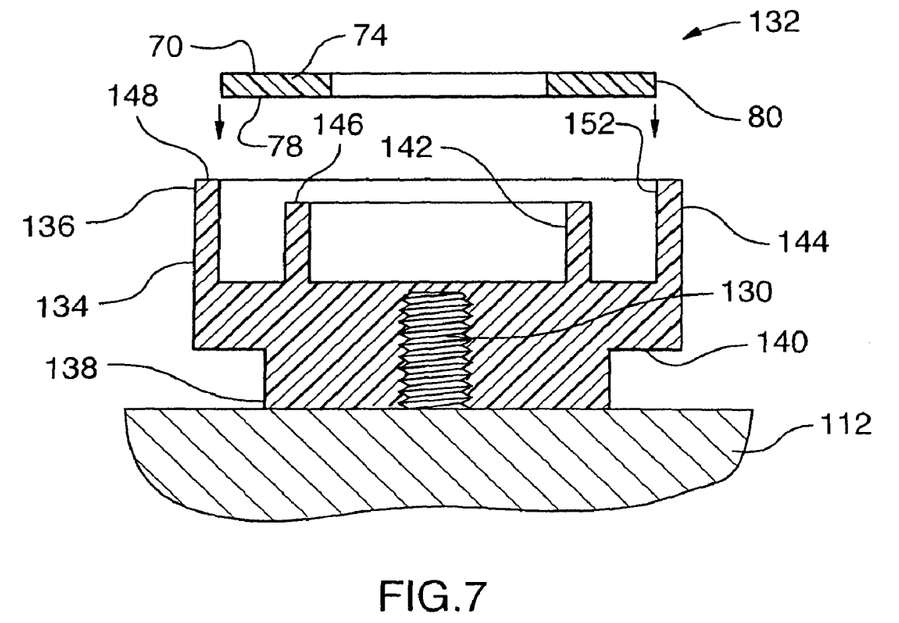
FIG. 7 is an enlarged cross-sectional view of the holder provided on the robot illustrated in FIGS. 6a and 6b, shown exploded from the annular sealing member.

Referring now to FIGS. 6a, 6b and 7, there is shown a robot 100 which is used to fit the sealing member 70 onto the inflow end 46 of the corporation stop 24. The robot 100 includes a transport skid 102 sized to fit within the space $S_1$ of the main conduit 20, and a scissor lift assembly 104 supported on the skid 102. The skid 102 has a front end 106, an opposed rear end (not shown) and a sidewall 108 which extends between the front and rear ends to define the generally tubular body of the skid 102. At the front end 106, a large section of the upper portion of the sidewall 108 has been cut away to accommodate the placement of the scissor lift assembly 104. Tethered to each of the front and rear ends of the skid 102 is a chain or cable 110 which is in turn connected to a front/rear motorized winch (not shown). To move the skid 102 to a desired position within the main conduit 20, the front or rear winch may be activated to pull the skid 102 frontward or rearward in a sled-like fashion along the conduit wall 26 of the main conduit 20.

The scissor lift assembly 104 has a pair of spaced apart, first and second base blocks 112 and 114, and a movable platform 116. First and second lateral pairs of scissor arms 120 and 122 (only one such pair being visible in FIGS. 6a and 6b) connect the base blocks 112 and 114 to the platform 116. Also provided is a re-circulating (or endless) threaded screw 124 actuated by a motor (not shown). The second base block 114 has a threaded aperture (not shown) which is adapted to receive and engage the re-circulating screw 124. When the motor is energized, the re-circulating screw 124 is urged to rotate in a clockwise or counter-clockwise direction. The rotation of the screw 124 causes the second base block 114 to move or ride along the screw 124 toward or away from the first base block 112, thereby shortening or lengthening the distance between the tips 126 and 128 of the scissor arms 120 and 122. It will be understood that the platform 116 will be raised above (or moved away from the base blocks 112 and 114) by shortening the distance between the tips 126 and 128. In contrast, the platform 116 will be lowered toward the base blocks 112 and 114 by lengthening the distance between the tips 126 and 128. The tip 128 of scissor arm 122 is captively engaged within the horizontal slot 129 defined on the lateral face 131 of the platform 116 adjacent the front end 133 thereof. During the raising and lowering of the platform 116, the tip 128 travels forwardly or rearwardly within the slot 129.

In alternative embodiments, the scissor lift assembly could be configured differently. For instance, it could be provided with only a single pair of scissor arms and the assembly for lowering and raising the platform could be configured without a re-circulating screw and motor. The scissor lift assembly could be actuated pneumatically. In still other embodiments, the scissor lift assembly could be replaced with other known vertical displacement mechanisms.

Attached to the platform 112 via a fastener 130 is a holder or retaining member 132 which is adapted to retain the annular sealing member 70 and allow its accurate placement on the corporation stop 24. With reference to FIG. 7, the holder 132 has a generally cylindrical body 134 extending between upper and lower ends 136 and 138. A short distance upward from the lower end 138, a step 140 is formed where the diameter of the body 134 increases. The body 134 is hollowed out at the upper end 136 to form two, relatively thin-walled, spaced apart, concentric rings—an inner ring 142 and an outer ring 144. The upper edge 146 of the inner ring 142 sits relatively lower than the upper edge 148 of the outer ring 144. The inner ring 142 and the outer ring 144 co-operate with each other to define a seat or a station 150 for snugly retaining the annular sealing member 70. More specifically, when mounted within the holder 132, the second surface 78 of the sealing member 70 is supported on the upper edge 146 of the inner ring 142 with the outer edge 80 of the sidewall 74 bearing against the inner surface 152 of the outer ring 144.

In this embodiment, the station 150 with its concentric rings 142 and 144 is well-adapted to accommodate the annular sealing member 70. However, as mentioned above, in other embodiments, the sealing member could be configured differently. More specifically, it could be formed to have a non-circular footprint. In such cases where the footprint of the sealing member is non-circular, it will be appreciated that the holder could configured to provide a suitable station for accommodating such a sealing member.

Preferably, the holder 132 is made of a translucent or transparent material so as to facilitate placement of the sealing member 70 onto the corporation stop 24 by the operator of the robot. In this embodiment, the holder 132 is made from NSF polyurethane polished to a transparent finish. In other embodiments, other suitable materials may be used.

An exemplary method of rehabilitating the main conduit 20 using the liner 32 and the sealing member 70 is now described in greater detail. Prior to deploying the liner 32 and the sealing member 70 into the main conduit 20 to be rehabilitated, a number of preliminary steps are carried out, namely: (a) arranging access to the main conduit 20 to be rehabilitated; (b) cleaning the inner surface 30 of the main conduit 20; (c) fitting the sealing member 70 onto the service connection 24; and (d) pre-treating the liner 32 prior to insertion into the main conduit 20. Steps (a), (b) and (d) are generally known to those skilled in the art of structural pipe lining and are substantially as described in Canadian Patent No. 2,361,960. Nonetheless, for the sake of completeness, these steps are described briefly below.

More specifically, two spaced apart, first and second access pits (not shown) for accessing opposing ends of the main conduit segment to be rehabilitated, are selected and prepared. The first access pit serves as the entry point through which the liner 32 may be inserted into the main conduit 20, while the second access pit is intended as an exit. Disposed at the second access pit is machinery (for instance, a winch—not shown) operable to pull the liner 32 through the main conduit 20 during the installation procedure.

The main conduit 20 is cleaned or scoured to remove any deposits, scales or encrustations which may have accumulated on the inner surface 30. This cleaning step tends to facilitate deployment of the liner 32 and enhance adhesion or bonding contact between the liner 32 and the main conduit 20, thereby reducing the risk of liner failure. Locating and mapping of the service connection 22 may also take place at this time.

Once the preliminary preparatory work on the main conduit 20 has been completed and prior to the insertion of the liner 32 in the main conduit 20, the sealing member 70 may be fitted onto the service connection 22. This step is performed using the robot 100 (shown in FIGS. 6a and 6b) equipped with a video camera (not shown). The sealing member 70 is first manually placed into the station 150 of the holder 132 and then the robot 100 is introduced at one end of the main conduit 20. Using a remote control and television unit (both not shown) and the front and rear winches (not shown), an operator directs the robot 100 to the precise location of the service connection 22 within the main conduit 20. Thereafter, the operator actuates the scissor lift assembly 104 to raise the platform 112 up to the corporation stop 24. As the second base block 114 travels along the re-circulating screw 124 toward the first base block 112, the gap between the tips 126 and 128 of the scissor arms 120 and 122 is narrowed resulting in the platform 112 being lifted or raised (as shown in FIGS. 6a and 6b). With the aperture 84 of the sealing member 70 aligned with the corporation stop 24, the sealing member 70 may then be fitted onto the inflow end 46 with the inner edge 82 of the body 62 snugly engaging the threading 42 on the portion 44 of the corporation stop 24. As best shown in FIG. 5, the robot 100 urges the first surface 76 of the body 72 to abut the inner surface 30 of the main conduit 20. As it does so, the sealing member 70 flexes to conform to the curvature of the inner surface 30.

Prior to inserting the liner 32 in the main conduit 20, the liner 32 is saturated with a curable adhesive resin. This liner treatment step may be performed at the job site or at an appropriate off-site location. The curable adhesive resin is injected into the voids 54 between the outer and inner jackets 50 and 52 using injection techniques commonly known in the art. To encourage uniform distribution of the curable adhesive resin within the liner 32, the liner 32 is passed through a set of compression rollers. The pressure applied by the compression rollers urges the curable adhesive resin to flow from the voids 54, through the inner surface 56 and ultimately, to the outer surface 92 of the outer jacket 50, thereby ensuring that the outer surface 92 is substantially covered with curable adhesive resin and that air is substantially removed from the jackets 50 and 52. It will be appreciated that, in other embodiments, different techniques could be used saturate the liner with curable adhesive resin and ensure its even distribution therein.

While it is generally preferred that the liner treatment step follow installation of the sealing member 70 onto the service connection 22 so as to avoid premature curing of curable adhesive resin before the liner 32 is in position with the conduit 20, it need not be the case in every application. In certain embodiments, the liner treatment step could be performed prior to installing the sealing member 70.

Once the liner 32 has been treated with the curable adhesive resin, it can be introduced into the main conduit 20 through the first access pit using the "winch-in-place" technique. The liner 32 is pulled through the length of the main conduit 20 (by the machinery stationed at the second access pit) until a selected location has been reached. Once in position, the liner 32 is ready to be conformingly applied against the inner surface 30 of the main conduit 20. This is achieved by using liner shaping or forming techniques generally known to those skilled in the art, such as a "pressure-expandable" technique. More specifically, a generally cylindrical shaping member (not shown) is introduced into one end of the liner 32 and is pushed through the main conduit 20 toward the opposite end thereof by (preferably cold) pressurized water. As the shaping member passes through the liner 32, it urges the outer jacket 50 of the liner 32 to be pressed up against the inner surface 30 of the main conduit 20 and enhances distribution of the curing adhesive resin through the outer jacket 50. The curing adhesive resin may be urged to flow into, and fill, any cracks formed in the inner surface 30. The pressure of the water maintains the outer jacket 50 against the inner surface 30 after passage of the shaping member.

When the shaping member travels over the location where the inflow end 46 of the corporation stop 24 protrudes into the space $S_1$, the outer jacket 50 is pushed up against the inflow end 46 thereby blocking the inflow aperture of the corporation stop 24 and creating a bulge or protrusion 160 in the liner 32, as shown in FIG. 8. Curable adhesive resin on the outer surface 92 of the outer jacket 50 is urged to spread onto the inflow end 46 and the body 72 of the sealing member 70. In the vicinity of the inflow end 46, voids 102 are formed between the outer surface 92 of the outer jacket 50 and the inner surface 30 of the main conduit 20 (see FIG. 8).

Figure 9:
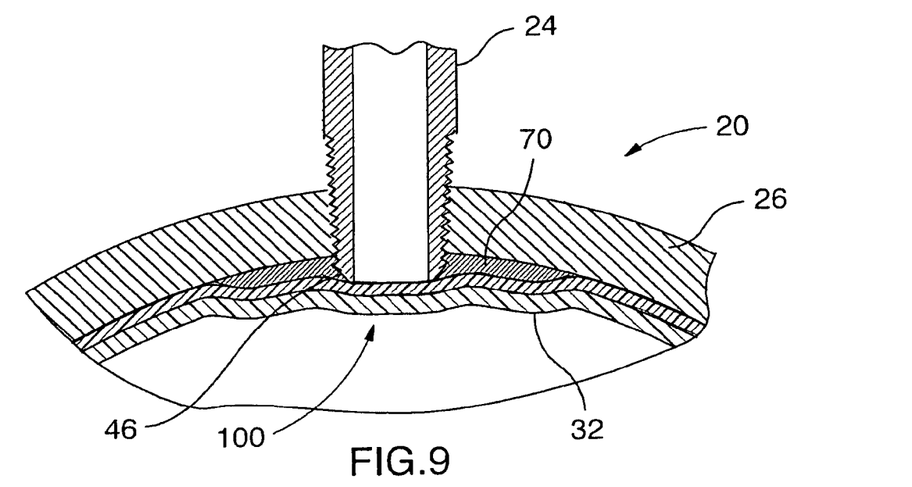
FIG. 9 is an enlarged partial cross-sectional view similar to that illustrated in FIG. 5 showing the liner and the sealing member in the main conduit after curing.

Once the liner 32 has been formed, the curing process may be initiated by circulating hot pressurized water through the conduit space $S_2$ for a suitable period of time. The temperature of the pressurized water will depend on the curing temperature of the curable adhesive resin and the resin/hardener mixture in the sealing member 70. In this embodiment, the temperature of the pressurized water is maintained at 64° C. As the hot pressurized water passes through the liner 32, the heat from the water causes the viscosity of the curable adhesive resin impregnated in the liner 32 and the resin/hardener mixture in the sealing member 70 to drop. This reduction of viscosity softens the curable adhesive resin and the resin/hardener mixture and allows them to fuse (merge or integrate) with each other. As a result of the pressure exerted on it by the liner 32, the body 72 of the sealing member 70 is urged to deform and fill or occupy the voids 102, in particular, the spaces surrounding the threading 42 on the inflow end 46 (as best shown in FIG. 9). After the hot pressurized water is re-circulated for a sufficient period of time, the curable adhesive resin and the resin/hardener mixture will have hardened with the liner 32 and the sealing member 70 now forming a robust unitary (or integrated) structure which is firmly bonded to the main conduit 22 and the corporation stop 24.

While it is generally preferred that the liner forming step be performed prior to the curing step, it will be appreciated that, in other embodiments, the liner forming and curing steps could be performed concurrently by flowing hot pressurized water to form the liner.

Figure 10:
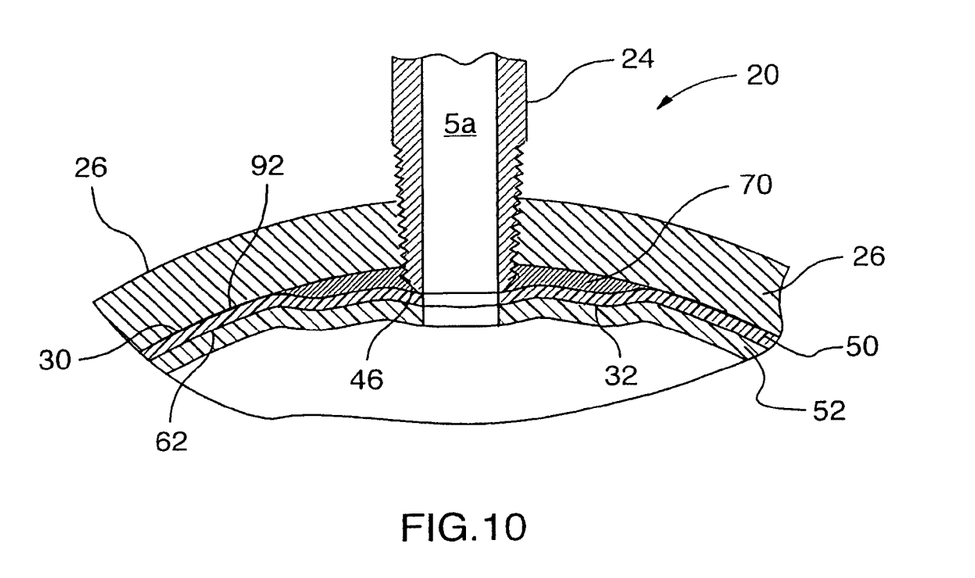
FIG. 10 is an enlarged partial cross-sectional view similar to that illustrated in FIG. 5 showing the inflow end of the service connection unobstructed and open to allow flow of water therethrough.

With the liner 32 and the sealing member 70 now properly cured and the hot pressurized water drained from the main conduit 20, the service connection 22 can now be opened to restore the free flow of potable water therethrough. The robot 100 is introduced into the rehabilitated main conduit 20 and is directed to the location within the conduit 20 where the bulge or protrusion 160 is. The location of protrusion 160 may be known from the mapping activities previously performed. Using the video camera (not shown) mounted on the robot 100, the operator positions the robot 100 directly beneath the protrusion 160 and lifts a drilling tool (not shown) up to the protrusion 160 at the precise location of the service connection 22. The operator then activates the drilling tool to create an opening through the liner 32 that provides access to the pipe space $S_2$ of the corporation stop 24. Such drilling action on the wall of the liner 32 tends not to affect the water tightness of the rehabilitated conduit 20. The curable adhesive resin (and resin/hardener mixture from the sealing member 70) that surrounds the threading 42 on the inflow end 46 provides enhanced sealing in the region and tends to form a tight bond with the liner thereby enhancing the structural integrity of the rehabilitated conduit 20 in that area and promoting water tightness. FIG. 10 shows the inflow end 46 of the service connection 22 unobstructed and open to allow flow of water therethrough. After opening of the service connection 22, a final inspection takes place to ensure the liner has been properly deployed. Upon satisfactory inspection, the now rehabilitated main conduit 20 is flush cleaned, disinfected (e.g. by chlorination) and the service is restored.

An exemplary method of rehabilitating a conduit using a cure-in-place liner and a sealing member for fitting in surrounding relation with the protruding end of a corporation stop has been described above. However, it will be appreciated that, in accordance with the principles of the present invention, the sealing member is not limited to being used solely in conjunction with dual-jacket liners of the type described above. The sealing member can also be successfully deployed or used with other types of cured-in-place pipe liners. For example, the sealing member could be used with inversion-type liners such as those described in Canadian Patent No. 2,630,074 of Anders et al and U.S. Pat. No. 6,117,507 of Smith; the disclosures of which are hereby incorporated by reference.

In the case of an inversion liner, the sealing member would be snugly fitted onto the inflow end of the corporation stop in much the same manner as described above. The sealing member would be fabricated from a resin (preferably, a thermoset resin), which when cured, would fuse (merge or integrate) with the inversion liner to form a unitary (or integrated) structure therewith.

To deploy the inversion liner, the steps described above in respect of liner 32 would be generally followed with minor modifications. More specifically, the inversion liner would be impregnated or saturated with a curable resin (preferably, a thermoset resin), such as the resin sold by Novoc Performance Resins, LLC of Sheboygan, Wis. and marketed under the NOVOC™ brand, prior to being inserted into the main conduit. Following the impregnation, the inversion liner would be inserted into the main conduit. This would achieved using known inversion techniques, such as those described in U.S. Pat. No. 6,117,507 of Smith; the disclosure of which is hereby incorporated by reference. One such known technique involves introducing an elbow feed member into one end of the main conduit, turning the leading end of the inversion liner back onto itself and fixing it to the lower end of the elbow feed member. A fluid, such as water or air, is then pumped into the elbow feed member. As the pressurized fluid flows through the elbow feed member it exerts a force on the folded back portion of the inversion liner, thereby causing the liner to invert into and along the interior of the main conduit. The action of the pressurized fluid against the walls of the inversion liner would shape the liner to conform to the inner surface of the main conduit. With the inversion liner formed or shaped, the curing process could be initiated by circulating hot pressurized water through the conduit space for a suitable period of time. As described above, as the hot pressurized water passes through the inversion liner, the heat from the water causes the viscosity of the curable adhesive resin impregnated in the inversion liner and the resin/hardener mixture in the sealing member to drop. This reduction of viscosity softens the curable adhesive resin and the resin/hardener mixture and allows them to fuse (merge or integrate) with each other. As a result of the pressure exerted on it by the inversion liner, the sealing member is urged to deform and fill or occupy the voids that surround the threading on the inflow end of the corporation stop. After the hot pressurized water is re-circulated for a sufficient period of time, the curable adhesive resin and the resin/hardener mixture will have hardened with the inversion liner and the sealing member now forming a robust unitary structure which is firmly bonded to the main conduit and the corporation stop. Thereafter, a final inspection will be performed and the service connection 22 may be opened to restore the free flow of potable water therethrough as described above.

While the foregoing description discloses using a sealing member in accordance with the principles of the present invention with different types of cured-in-place liners, it should be appreciated that the sealing member could also be used to similar advantage with thermoformed PVC liners (also referred to as "fold and form" liners). An exemplary method of rehabilitating a conduit using a "fold and form" liner and a sealing member is now described. As a preliminary matter, a folded thermoformed polyvinyl chloride (PVC) liner for covering the inner surface of the tubular conduit to be rehabilitated and a flexible sealing member, are provided. The liner is fabricated from a PVC compound which is selected for its flexibility and its thermo-plastic memory. The sealing member is made from a material which, when cured, is capable of fusing (merging or integrating) with the PVC liner to form a unitary (or integrated) structure therewith. The material may be a curable adhesive resin or other suitable composition.

Access is provided to the inner conduit space of the tubular conduit. Next, the sealing member is snugly fitted onto the protruding portion of the at least one service connection in surrounding relation therewith, as described in greater detail above. The folded liner is pre-heated to a predetermined temperature to allow it to become pliable (or malleable) enough such that it may be pulled in place within the conduit with minimal resistance. Once sufficiently pre-heated, the folded liner is inserted into the conduit and pulled therethrough using a cable and winch.

The next step of the method involves shaping or forming the liner to cause the liner to unfold and conform to the inner surface of the conduit. This can be achieved by delivering steam or hot pressurized air through the liner. As the liner is being shaped over the inflow end of the corporation stop which protrudes into the conduit space, the wall of the liner is pushed up against the inflow end thereby blocking the inflow aperture of the corporation stop and creating a bulge or protrusion in the liner. Exposed to the raised temperature of the steam or hot pressurized air, the material of the sealing member cures. As it does so, the sealing member is: (a) initially caused to deform and to at least partially occupy the gaps between the protruding portion of the at least one service connection and the liner; and (b) subsequently urged to harden. Once hardened, the sealing member forms a unitary structure with the liner and creates a seal about the protruding portion of the at least one service connection. After the liner has been formed, it is cooled for a predetermined period of time using compressed air or a mixture of compressed air and water. Thereafter, a final inspection will be performed and the service connection can be opened to restore the free flow of potable water therethrough as described above.

As will be appreciated by a person skilled in the art, the use of a sealing member made of a curable adhesive resin or other material which is capable, on the one hand, of deforming to fill in the voids around the corporation stop and on the other hand, merging or integrating with the liner to form a unitary structure when cured, provides an elegant solution to the sealing problems encountered with the prior art conduit rehabilitation methods discussed above. Advantageously, this solution is relatively simple, quick and inexpensive to deploy and can easily be incorporated into existing conduit rehabilitation methods.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. A method for rehabilitating a tubular conduit having an inner conduit space and at least one service connection tied into the tubular conduit, a portion of the at least one service connection protruding into the inner conduit space, the method comprising the steps of:

providing a liner for covering the inner surface of the tubular conduit, the liner being made of a flexible material capable of being impregnated with a first curable adhesive resin and having a film made of a material impermeable to liquid bonded onto the inner surface of the liner;

providing a flexible sealing member made of a second curable adhesive resin;
providing access to the inner conduit space of the tubular conduit;
snugly fitting the sealing member onto the protruding portion of the at least one service connection in surrounding relation therewith;
impregnating the liner with the first curable adhesive resin;
inserting the liner into the tubular conduit;
shaping the liner to conform to the inner surface of the tubular conduit, a portion of the liner bearing against the protruding portion of the at least one service connection; and
curing the first curable adhesive resin in the liner and the second curable adhesive resin in the sealing member so as to: (a) initially cause the second curable adhesive resin to deform and to at least partially occupy gaps between the protruding portion of the at least one service connection and the liner and, (b) subsequently cause the first curable adhesive resin and the second curable resin to harden; the liner and the sealing member together forming a unitary structure and a seal about the protruding portion of the at least one service connection once the first curable resin and the second curable resin have hardened.

2. The method of claim 1 further comprising, prior to the snugly fitting step, transporting the sealing member to a location directly below the protruding portion of the at least one service connection.

3. The method of claim 2 wherein:
the sealing member has a body provided with a central aperture; and
the snugly fitting step includes:
aligning the central aperture of the sealing member with the protruding portion of the at least one service connection; and
causing the protruding portion of the at least one service connection to be received within the central aperture of the sealing member.

4. The method of claim 3 wherein the snugly fitting step further includes urging the top surface of the sealing member to bear against the inner surface of the tubular conduit and causing the body of the sealing member to flex to conform to the curvature of the inner surface of the tubular conduit.

5. The method of claim 1 wherein the snugly fitting step is carried out by a remote controlled robot.

6. The method of claim 1 wherein:
the method further comprises the step of a providing a robot, the robot including a transport skid for traveling within the inner conduit space, a lift assembly supported on the skid and a holder mounted on the lift assembly for retaining the sealing member; and
the snugly fitting step is carried out by a remote controlled robot.

7. The method of claim 6 further comprising the step of placing the sealing member into the holder.

8. The method of claim 7 further comprising the step of moving the transport skid in the tubular conduit to a location directly below the protruding portion of the at least one service connection.

9. The method of claim 8 further comprising the step of actuating the lift assembly to raise the sealing member up to the protruding portion of the at least one service connection.

10. The method of claim 1 wherein the step of inserting the liner into the tubular conduit includes pulling the liner into place within the tubular conduit.

11. The method of claim 1 wherein the step of inserting the liner into the tubular conduit includes putting the liner into place within the tubular conduit by inversion.

12. The method of claim 1 wherein the shaping step and the curing step are carried out concurrently.

13. The method of claim 1 wherein the curing step includes exposing the first curable adhesive resin in the liner and the second curable adhesive resin in the sealing member to heat.

14. The method of claim 13 wherein the exposing step includes circulating hot pressurized water within the space defined by the inner surface of the liner.

15. The method of claim 1 wherein the second curable adhesive resin is the same as the first curable adhesive resin.

16. The method of claim 1 wherein the first curable adhesive resin is made from a 3:1 ratio of resin to hardener.

17. The method of claim 1 wherein the second curable adhesive resin is made from between a 1:1 ratio of resin to hardener to a 3:1 ratio of resin to hardener.

18. The method of claim 1 wherein the second curable adhesive resin has a curing temperature that is less than or equal to the curing temperature of the first curable adhesive resin.

19. The method of claim 18 wherein the curing temperatures of the first and second curable adhesive resins lie between approximately 64° C. and approximately 74° C.

20. The method of claim 1 wherein the sealing member has an annular body provided with a central aperture.

21. The method of claim 20 wherein:
the annular body has an outer diameter and an inner diameter corresponding to the diameter of the central aperture; and
the ratio of annular body outer diameter to annular body inner diameter ranges between approximately 1.5 and approximately 2.0.

22. The method of claim 20 wherein:
the annular body has a top surface, a bottom surface and a thickness T measured between the top and bottom surfaces; and
the thickness T measures between approximately 2.0 mm and approximately 5.0 mm.

23. The method of claim 1 further comprising opening the service connection from within the inner conduit space.

24. A kit for rehabilitating a tubular conduit having an inner conduit space and at least one service connection tied into the tubular conduit, a portion of the service connection protruding into the inner conduit space, the kit comprising:
a liner capable of being shaped to conform to the inner surface of the tubular conduit, the liner being made of a flexible material capable of being impregnated with a first curable adhesive resin and having a film made of a material impermeable to liquid bonded onto the inner surface of the liner; and
a flexible sealing member made of a second curable adhesive resin, the sealing member being configured to snugly fit onto the protruding portion of the at least one service connection in surrounding relation therewith;
when the liner is shaped to conform to the inner surface of the tubular conduit, the sealing member is snugly fitted onto the protruding section of the at least one service connection and the first and second curable adhesive resins are cured, the liner and the sealing member together form a unitary structure and a seal about the protruding section of the at least one service connection.

25. The kit of claim 24 wherein the liner is a multi-ply liner.

26. The kit of claim 24 wherein the liner is an inversion-type liner.

27. The kit of claim 24 wherein:
the liner has an outer jacket for placement against the inner surface of the tubular conduit and an inner jacket; and
the inner surface of the inner jacket corresponds to the inner surface of the liner.

28. The kit of claim 24 wherein the first curable adhesive resin is made from a 3:1 ratio of resin to hardener.

29. The kit of claim 24 wherein the second curable adhesive resin is made from between a 1:1 ratio of resin to hardener to a 3:1 ratio of resin to hardener.

30. The kit of claim 24 wherein the second curable adhesive resin is the same as the first curable adhesive resin.

31. The kit of claim 24 wherein the second curable adhesive resin has a curing temperature that is less than or equal to the curing temperature of the first curable adhesive resin.

32. The kit of claim 24 wherein the curing temperatures of the first and second curable adhesive resins lie between approximately 64° C. and approximately 74° C.

33. The kit of claim 24 wherein the sealing member has an annular body provided with a central aperture.

34. The kit of claim 33 wherein:
the annular body has an outer diameter and an inner diameter corresponding to the diameter of the central aperture; and
the ratio of annular body outer diameter to annular body inner diameter ranges between approximately 1.5 and approximately 2.0.

35. The kit of claim 33 wherein:
the annular body has a top surface, a bottom surface and a thickness T measured between the top and bottom surfaces; and
the thickness T measures between approximately 2.0 mm and approximately 5.0 mm.

36. The kit of claim 24 further comprising a robot for snugly fitting the sealing member onto the protruding portion of the at least one service connection.

37. The kit of claim 24 wherein the robot includes a transport skid for traveling within the inner conduit space, a lift assembly supported on the skid and a holder mounted on the lift assembly for retaining the sealing member; the lift assembly being operable to raise the holder toward the protruding portion of the at least one service connection.

38. A rehabilitated conduit comprising:
a tubular conduit having an inner conduit space and at least one service connection tied into the tubular conduit, a portion of the at least one service connection protruding into the inner conduit space;
a liner made of a flexible material impregnated with a first curable adhesive resin and having a film made of a material impermeable to liquid bonded onto the inner surface of the liner; the liner being cured in place and shaped to conform to, and bonded to, the inner surface of the tubular conduit; and
a sealing member made of a second curable adhesive resin, the sealing member being mounted onto the protruding portion of the at least one service connection in surrounding relation therewith and cured in place;
the liner and the sealing member together forming a unitary structure and a seal about the protruding portion of the at least one service connection.

39. A method for rehabilitating a tubular conduit having an inner conduit space and at least one service connection tied into the tubular conduit, a portion of the at least one service connection protruding into the inner conduit space, the method comprising the steps of:
providing a folded, thermoformed polyvinyl chloride (PVC) liner for covering the inner surface of the tubular conduit;
providing a flexible sealing member made of a material which, when cured, is capable of fusing with the liner to form a unitary structure therewith;
providing access to the inner conduit space of the tubular conduit;
snugly fitting the sealing member onto the protruding portion of the at least one service connection in surrounding relation therewith;
pre-heating the folded liner to a predetermined temperature;
inserting the pre-heated liner into the tubular conduit;
shaping the liner to cause the liner to unfold and conform to the inner surface of the tubular conduit, a portion of the unfolded liner bearing against the protruding portion of the at least one service connection;
curing the material in the liner so as to: (a) initially cause the material to deform and to at least partially occupy gaps between the protruding portion of the at least one service connection and the liner; and (b) subsequently cause the material to harden; once hardened, the sealing member forming a unitary structure with the liner and creating a seal about the protruding portion of the at least one service connection.

* * * * *